United States Patent [19]

Tourtellotte

[11] 3,738,478

[45] June 12, 1973

[54] CONVEYOR CHAIN
[75] Inventor: Frederick Tourtellotte, Royal Oak, Mich.
[73] Assignee: The Cross Company, Fraser, Mich.
[22] Filed: Mar. 26, 1971
[21] Appl. No.: 128,263

[52] U.S. Cl. ............................................. 198/181
[51] Int. Cl. ........................................... B65g 15/00
[58] Field of Search.................... 198/181, 182, 189

[56] References Cited
UNITED STATES PATENTS
2,526,563   10/1950   Keen.................................. 198/189
2,021,748   11/1935   Schaefer............................. 198/189
2,279,207   4/1942    Schenk............................... 198/189
967,424     8/1910    O'Toole.............................. 198/182

Primary Examiner—Richard E. Aegerter
Assistant Examiner—Douglas D. Watts
Attorney—Harness, Dickey & Pierce

[57] ABSTRACT

A conveyor chain having top load supporting plates mounted for limited vertical rocking movement and normally occupying a slightly nose-down position but adapted to move to flat horizontal positions when work carrying pallets or the like are supported thereon.

10 Claims, 6 Drawing Figures

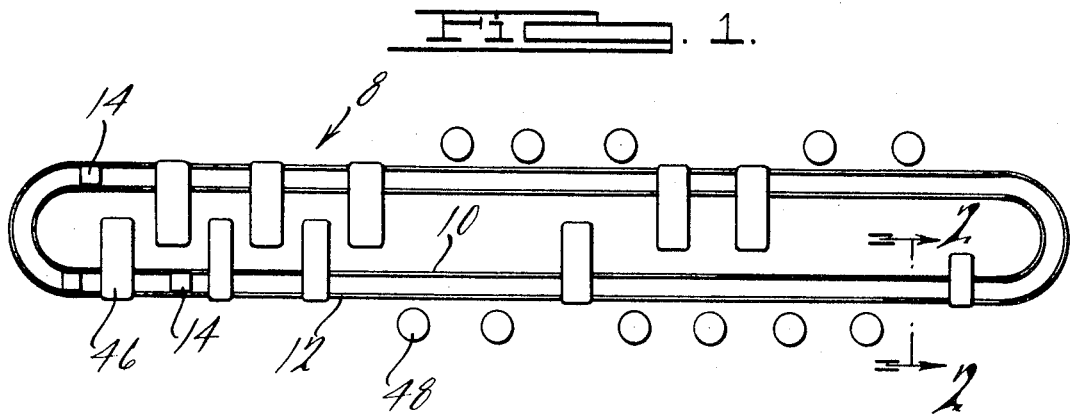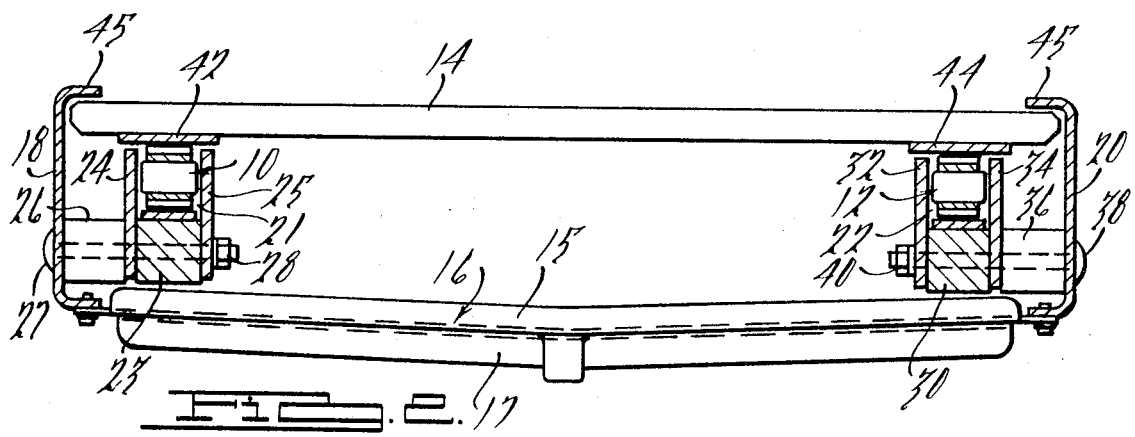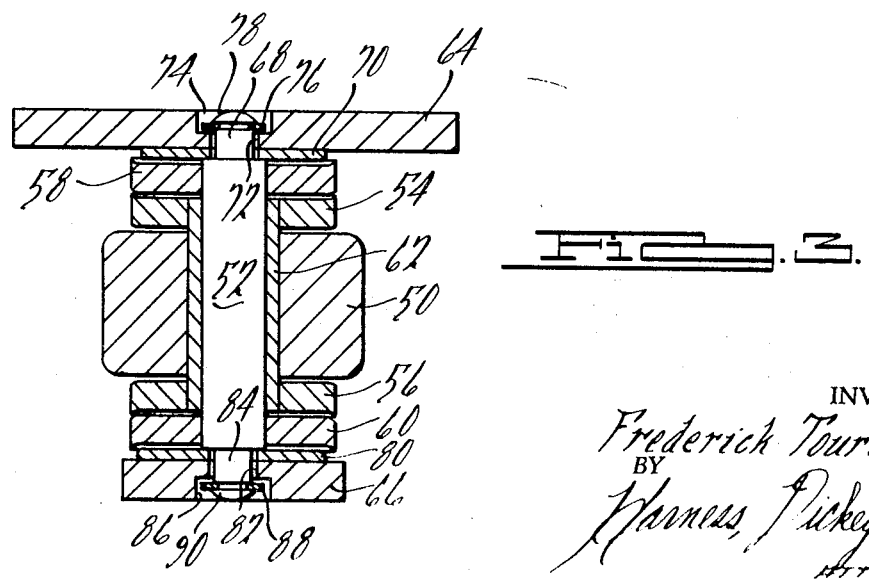

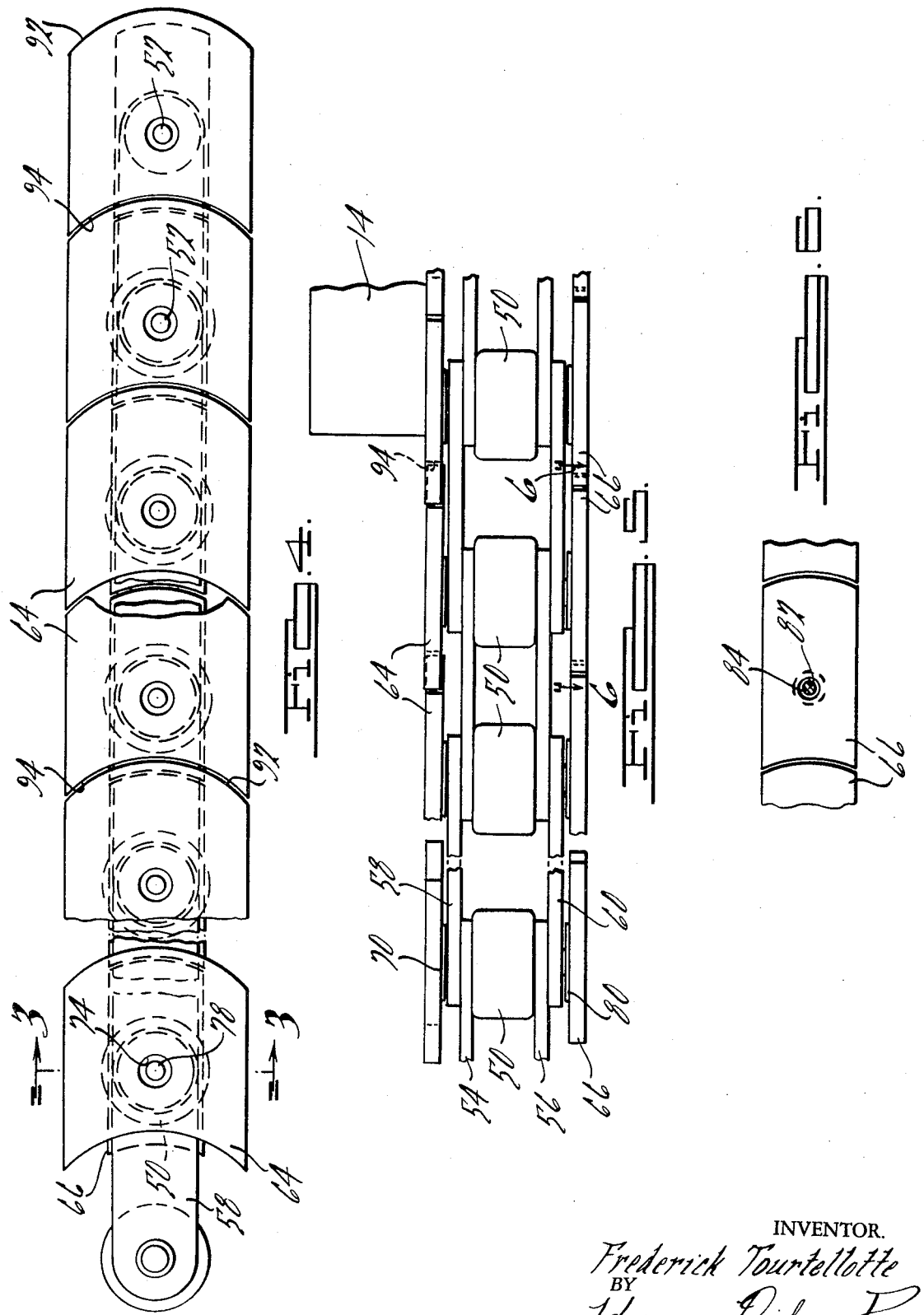

CONVEYOR CHAIN

BACKGROUND OF THE INVENTION

In certain types of industrial conveyor and work processing lines, work carrying pallets disposed on and supported wholly or in part by parallel power driven chains are carried by the latter along a predetermined route. A typical example is a work process line wherein palletized workpieces are carried successively through a series of work and/or assembly stations. In at least one type of work process line, the work carrying pallets which sometimes are relatively large and heavy, rest on parallel, inner and outer, horizontal continuous chains which are power driven to travel at essentially the same linear speed. Both chains travel in and are guided by annular ways; and the chains extend at least slightly above their respective ways so that they carry the entire or substantially the entire weight of the pallets. As the pallets move on the chains into work or assembly stations along the process line, they are stopped by a suitable mechanism in the station and located and clamped securely in position while an assembly or machining operation is performed on the work carried thereby. Frequently, immediately ahead of each station, following pallets are stopped and banked by a suitable escapement or other mechanism or by bumping into the preceding pallet. The pallets in the stations are sometimes lifted entirely or partially off the transport chains but this is not always done. In the latter event, and in any event with respect to the banked pallets, the transport chains, which operate continuously, simply slide under and against the pallets. When the assembly or machining operation is complete in any station, the pallet in that station is released and re-engaged by friction with the transport chains which advance it along the line. The lead pallet in the bank immediately preceding the station is then moved into the station; and the other banked pallets are correspondingly advanced in the waiting position.

In equipment of the above mentioned type, certain problems are encountered particularly with respect to the transport chains. For one thing, there frequently is excessive wear of the chains and of the pallets as the chains slide under the pallets which are stopped in the various stations and the banks of pallets immediately preceding the stations. The chains usually are surmounted by hardened wear plates and the undersurface of the pallets are correspondingly hardened but that alone does not obviate excessive wear particularly over a long period of time and where the pallets are large and heavy. Attempts have been made to lubricate the wear plates of the transport chains but the lubricant tends to be wiped away by the edges of the pallets as the chains pass under the pallets. Also, in many machines and work process lines, the transport chains are required to turn corners of relatively short radius and the size of the chains necessary to sustain the drive forces required by the conditions of use and to support and transfer the large number of pallets being handled at any one time on the line, heretofore, has placed a severe limitation on the minimum radius of turn. In addition, problems have frequently been encountered by parts delivered to assembly stations or other particles or things coming off the line in machining stations falling onto the transport chains and lodging and jamming between the large heavy wear plates.

SUMMARY OF THE INVENTION

The transport chains of this invention are equipped with wear plates of a novel design which are mounted on the chains for limited vertical rocking movement and normally travel in a slightly nose-down position. In a preferred embodiment, the chains are disposed with the pintles which pivotally interconnect the various links thereof extending vertically; and the wear plates are mounted on upwardly extending terminal end portions of the pintles by means of holes which are sufficiently larger in diameter than the pintles to permit the limited vertical rocking movement hereinabove referred to. The normal nose-down position of the wear plates preferably is achieved by positioning a major portion of the wear plates forwardly of the mounting pintles so that the plates are over-balanced in a forward direction by gravity.

As a result of the mounting and orientation of the wear plates hereinabove described, the forward portions of the wear plates duck under the leading edges of stationary pallets without touching the latter. However, as soon as the pintles on which the wear plates are mounted move to positions in line with the leading edges of the pallets, the wear plates rock on the pintles to flat horizontal positions; and as they do so, the forward portions thereof slap up against the bottoms of the pallets. As a result, lubricant on the plates is retained and provides anti-friction layers between the wear plates and the pallets so as to minimize wear as the plates slide under the pallets. In this manner the lubrication is not wiped off the wear plates as the latter move under the pallets as heretofore.

Also, as a special feature, the forward or leading ends of the wear plates are arcuately curved convexly; preferably about the mounting pintles as a center; and the rear edges of the wear plates are correspondingly curved concavely and spaced only slightly (preferably only a few thousandths of an inch) from the leading edges of the following wear plates. Thus, the wear plates interfit with each other and the joints between them are exceedingly small. Manifestly, the links of the transport chains pivot about the pintles as the chains negotiate a horizontal bend in the conveyor or process line; and the radius of the bend can be exceedingly small as the interfitting ends of the wear plates turn and adjust as required to negotiate the turn without varying the width of the crack or joint between adjacent plates. Thus, there is no greater tendency for foreign particles to lodge between the wear plates on curved portions of the line than on straight portions thereof.

DESCRIPTION OF THE DRAWINGS

FIG. 1 is a plan view diagrammatically illustrating a typical machine utilizing the conveyor chain of this invention;

FIG. 2 is an enlarged, fragmentary, sectional view taken on the line 2—2 of FIG. 1;

FIG. 3 is an enlarged, transverse, sectional view taken on the line 3—3 of FIG. 4;

FIG. 4 is a fragmentary, top view of a conveyor chain embodying the invention and showing parts thereof broken away for clearness of illustration;

FIG. 5 is a side elevational view of the conveyor chain; and

FIG. 6 is a fragmentary, longitudinal sectional view taken on the line 6—6 of FIG. 5.

DESCRIPTION OF THE PREFERRED EMBODIMENT

While the chain of this invention can be used in any environmental situation where the particular unique features and advantages thereof have utility, it is primarily adapted and preeminently suited for use on machine tools 8 of the type shown diagrammatically in FIG. 1. In machines of this type, inner and outer endless chains 10 and 12 mounted in uniformly spaced relation and in the same horizontal plane are adapted to support and to transport work carrying pallets 14. The endless loops defined by the chains 10 and 12 may have any desired shape but they usually are in the form of elongate ovals, as shown in the drawing. In practice, the chains 10 and 12 usually are mounted on suitable base structures (not shown) which support the pallets a suitable distance above the floor, usually about waist high to an operator standing alongside the machine.

In the form of the invention here shown by way of illustration, each of the base structures is provided with a top plate 16 which is reinforced by transverse flanges or angles 15 and 17 and carries inwardly facing channels 18 and 20 mounted thereon and fastened thereto at opposite sides thereof. The top plates 16 may or may not be continuous around the entire machine 8; but the channels 18 and 20 preferably are continuous as they support the ways 21 and 22 in which the chains 10 and 12 travel and define guides for the pallets 14. The ways 21 and 22 for the two chains 10 and 12 are similar, as perhaps best shown in FIG. 2.

The inner chain way 21 on the channel 18 comprises an elongate bottom member 23 and side plates 24 and 25 which extend uniform distances thereabove to define the way 21 for the chain 10. The way-forming support for the chain 10 is spaced inwardly from the channel 18 by suitable spacers 26 and the entire assembly is attached securely to the channel by bolts 27 and nuts 28. The outer chain way 22 on the channel 20 similarly comprises an elongate member 30 and side plates 32 and 34 and the assembled parts are similarly separated from the channel 20 by suitable spacers 36 and attached securely to the channel 20 by bolts 38 and nuts 40.

As shown, the chains 10 and 12 are supported directly on the bottom members 23 and 30; and they extend slightly above the side plates 24, 25 and 32, 34. Sufficient clearance is provided on both sides of the chains 10 and 12 so that they are free to travel without interference between the side plates 24, 25 and 32, 34; but the latter confine and guide the chains as they travel around the machine 8. The tops of the chains 10 and 12 extend sufficiently above the side plates 24, 25 and 32, 34 so as to support the pallets 14 spaced above the side plates. The pallets 14 preferably are provided at opposite sides thereof with longitudinal wear plates 42 and 44 which contact the chains 10 and 12 directly; and the pallets themselves travel between the side channels 18 and 20 directly below the upper flanges 45 of the latter, as shown in FIG. 2. As in the case of the chains 10 and 12, sufficient clearance is provided at the sides of the pallets 14 so that the latter are free to travel on the chains and around the machine 8 free of significant interference from the side plates 18 and 20. Similarly, the top flanges 45 of the channels 18 and 20 overlap the side marginal edges of the pallets 14 so as to prevent the latter from being lifted upwardly off the chains 10 and 12, but sufficient clearance is provided between the pallets 14 and the flanges 45 so that the latter in no way interfere with the free movement of the pallets. It will be readily appreciated that the size of the machine 8, and consequently the length of the pallet supporting chains 10 and 12 may vary considerably depending on the exigencies of the particular situation. Machines of this type conventionally are provided with machining stations or assembly stations or combinations thereof at appropriately spaced intervals along the length of the conveyor line defined by the chains 10 and 12. In FIG. 1, automatic machining or assembly stations are designated by the numeral 46 and manual assembly stations are designated by the numeral 48. The number and arrangement of the automatic and manual stations, of course, varies depending on the kind of operations to be performed on workpieces carried by the pallets 14. In any event, regardless of the size of the machine 8, the pallets 14 simply rest on the chains 10 and 12 and the latter are driven in the same direction at uniform speeds by suitable conventional drive means (not shown). The pallets 14 move with the chains 10 and 12 but are not fastened or in any way attached thereto. Thus, the chains 10 and 12 carry the pallets 14 entirely around the machine 8 and successively through the various automatic and manual stations 46 and 48.

As the pallets move into and through the stations 46 and 48, suitable machining or assembly operations are performed automatically or manually on work carried thereby. In practice, workpieces on assemblies usually are fastened securely to the pallets 14 by suitable fixtures (not shown). In the manual stations 48, operators usually do whatever has to be done to the work as the pallets move through the stations on the chains 10 and 12 which usually travel at a relatively slow speed. However, in the automatic stations 46, the usual practice is to stop the pallets 14 as they enter the stations so that the pallets and the work carried thereby are stationary while a machining or assembly operation is performed thereon. It is the usual practice also in the automatic stations 46 to locate the pallets 14 precisely and to clamp them solidly in the located position by suitable conventional locating and clamping means (not shown). In some instances, the locating and clamping mechanism is uniquely constructed to lift the pallet and the work off the chains 10 and 12 while the pallet is in the work station. However, in other instances, the locating and clamping mechanism may simply position and hold the pallet without lifting it entirely off the chains 10 and 12. In either event, the chains 10 and 12, which operate continuously, simply slide under the pallet while the latter is held stationary in the station.

It is necessary in machines of this type to provide space or room in advance of each automatic station 46 in which pallets 14 moved toward the station by the chains 10 and 12 may accumulate in a reserve or storage bank while work in the station is being worked upon. The lead pallet 14 in the storage space may be held by a suitable escapement mechanism or it may simply bump against the pallet in the station. In either event, pallets 14 accumulating in the storage space behind the lead pallet simply bump against and are held stationary by the preceding pallet. Manifestly, the conveyor chains 10 and 12 are required to slide under the pallets 14 in the storage and accumulating areas as well as the pallets in the automatic stations 46.

As suggested, some difficulty has been encountered heretofore with excessive wear on the chains and the pallets due to sliding friction as the chains move under the pallets which are held stationary in the automatic stations 46 or in the storage and accumulating areas ahead of these stations. Most of the wear apparently is due to lack of lubrication on the contact surfaces of the chains and the pallets. The pallet supporting chains conventionally are of the link type and the top plates of the chains which support the pallets conventionally are lubricated. However, the lubricant usually is scraped off or wiped away by the edges of the pallets as the chains slide under the latter; and any lubricant which remains on the chains is inadequate to lubricate the contact surfaces so as to eliminate excessive wear as the chains slide under the pallets.

The chain of this invention is uniquely constructed to solve the problem of inadequate lubrication. More particularly, the instant chain comprises horizontal laterally spaced rollers 50 rotatably mounted on vertical pintles 52 which are interconnected in uniform spaced relation by upper and lower links 54 and 56 and upper and lower outer links 58 and 60 journaled to oscillate about the end portions of the pintles 52. As suggested, the chains 10 and 12 travel in the ways 21 and 22 and the rollers 50 rotate on the pintles 52 when the chains contact the side plates 24, 25 and 32, 34 to minimize friction between the chains and the sides of the ways. In the particular form of chain here shown, sleeve bushings 62 surrounding the pintles 52 extend through the rollers 50 to minimize friction and wear between the rollers and the pintles 52; and the terminal end portions of the bushings are journaled in and retained by the upper and lower inner links 54 and 56.

It is a particular feature of the present invention that the chains 10 and 12 are provided with top and bottom wear plates 64 and 66, as perhaps best shown in FIG. 3. The top wear plates 64 are mounted on necked-down terminal end portions 68 of the pintles 52 and they preferably are held suitably spaced above the upper outer chain links 58 by spacers 70. It is significant also that the holes 72 in the top wear plates 64 through which the pintle end portions 68 extend are substantially oversize with respect to the end portions in that the latter are accommodated by countersinks 74 in the tops of the wear plates so that no part of the pintles extends above the wear plates. Also, it will be observed that the wear plates 64 are retained on the pintle 52 by washers 76 which are held securely on the pintles by peened-over ends 78 of the latter. As shown in FIG. 3, the bottom wear plates 66 are similarly spaced from the lower outer links 60 by spacers 80 and are similarly provided with enlarged holes 82 which receive and accommodate necked-down lower terminal end portions 84 of the pintles 52, and the lower end portions of the pintles 52 are accommodated in countersinks 86 provided in the bottoms of the wear plates 66. Washers 88 on the end portions 84 of the pintles in the countersinks 86 hold the wear plates 66 attached securely to the pintles and the washers are similarly held by peened-over lower ends 90 on the pintle. By reason of the fact that the ends of the pintles 52 are recessed in the countersinks 74 and 86, the outer surfaces of the upper and lower wear plates 64 and 66 are unobstructed and slide freely on the bottom members 23 and 30 and under the pallets 14.

By reason of the oversize holes 72, the upper wear plates 64 have limited vertical rocking movement on the pintles 52. As a practical matter, this movement may be relatively slight and the angular movement of the wear plates 64 on the pintles 52 need be only a few degrees to fit the requirements of this invention. In practice, it is desirable for the wear plates 64 to travel in a slightly nose-down position when the plates are not supporting a pallet, as perhaps best shown in FIG. 5. Manifestly, this positioning of the upper plates 64 can be accomplished in a number of different ways. Perhaps the simplest way of doing this is to position the hole 72 relatively closer to the rearward end of the plate 64 than to the forward end thereof, as shown in FIG. 4, so that a major portion of each plate is disposed forwardly of the pintle 52 on which it is mounted. Gravity then causes the forward portions of the wear plates 64 to nose down; and the wear plates normally travel with the forward end portions thereof disposed at a slightly lower level than the adjacent rearward end portions of the preceding wear plates.

Thus, when a pallet 14 is stopped and the chain begins to slide under the pallet, each wear plate 64 ducks under the pallet as the plate moves to a position underneath the latter. No significant contact will be established between the wear plate 64 and the pallet 14 until the pintle or pivot on which the wear plate is mounted moves to a position under the near edge of the pallet. As a consequence, lubrication on the top surface of the wear plate 64 is not scraped off as heretofore. Instead, the lubricant remains intact in the form of a relatively heavy film on the plate 64. Then, as the pintle or pivot pin 52 moves to a position under the pallet, the upwardly tilted rearward portion of the wear plate 64 contacts the edge of the pallet 14 and causes the nose-down forward portion thereof to slap upwardly against the bottom of the pallet. At this time, the wear plate 64 assumes a position parallel to the bottom surface of the pallet and the relatively thick film of lubricant therebetween serves as an anti-friction layer between the relatively moving parts. As a result, there is much less resistance to movement of the chains under the pallets and considerably less wear of the relatively moving surface, and less power is required to move the chains under the pallets.

The forward end 92 of each top wear plate 64 is curved convexly in an arc about the center of the pintle 52 on which the plate is mounted, as shown in FIG. 4, the rearward end 94 thereof is curved concavely in an arc about the center of the following pintle 52 and the adjacent ends of the wear plates are spaced relatively close together — preferably a few thousandths of an inch apart. Thus, when the chains 10 and 12 are required to negotiate a horizontal turn or bend, the top wear plates 64 pivot on the pintles 52 and there is no change in the spaces between adjacent wear plates. As a consequence, there is no opportunity or occasion for foreign particles such as shavings or small parts that may be dropped on the chains in assembly stations 46 or 48, for example, to become lodged or jammed between the plates. There, of course, is less tendency for foreign particles to fall to the bottom of the ways 21 and 22 due to the fact that the upper wear plates 64 overlap the side plates 24, 25 and 32, 34 of the ways, as shown in FIG. 2. However, the lower wear plates 66 also preferably are arcuately curved and they fit relatively close together in the same manner as the upper wear plates 64, as perhaps best shown in FIG. 6.

As a result of the novel chain construction and the special features hereinabove described, the conveyor chains of this invention have an especially high pallet load capacity. The chains are able to negotiate turns or bends of essentially small radius with ease. Furthermore, there is little tendency for parts to jam between the top wear plates as heretofore. The chain of this invention costs little more than conventional chains as the primary components thereof are essentially standard parts. Moreover, the anti-friction characteristics of the chain are much improved; and, consequently, the power requirements to drive the chains are correspondingly reduced.

I claim:

1. A conveyor chain adapted to carry and sometimes to slide beneath and relative to a load disposed thereon, said chain comprising,
    a plurality of successively arranged load supporting top plates adapted to carry a surface lubricant to minimize wear as the plates slide under the load,
    each of said plates having forward and rearward end portions and mounted on the chain for independent limited rocking movement between a generally nose-down position wherein the forward end portion thereof is disposed below said load and below the rearward end portion of the immediately preceding plate and a nose-up position wherein the forward end portion thereof is in substantially coplanar relation with the supported surface of the load and with the rearward end portion of the immediately preceding plate,
    means for biasing said plates toward said nose-down position whereby the forward, nose-down end portions of said plates can pass under the load without contacting the same and without appreciable loss of lubricant disposed thereon,
    each of said plates being movable from said nose-down position toward said nose-up position by engagement thereof with a load as the chain moves beneath the load,
    whereby lubricant is retained on said plates and is distributed between the underside of the load and the upper surfaces of said plates instead of being scraped from the latter by the load.

2. A conveyor chain as defined in claim 1 wherein said top plates are mounted and formed to permit movement thereof about axes extending generally vertically with respect to the plates and transversely of said chain.

3. A conveyor chain as defined in claim 1 having vertical pivots and wherein said top plates are mounted on and attached to said pivots at points behind the centers thereof to cause said forward end portions of said plates to tilt toward said nose-down position.

4. The combination as set forth in claim 3 wherein said pivots extend through said mounting plates, and
    wherein sufficient radial clearance is provided between said plates and said pivots to provide for the rocking movement of said plates to the normal nose-down position and to define the limits of said rocking movement.

5. The combination as set forth in claim 4 wherein the major portions of said top plates are disposed sufficiently forwardly of the pivots on which they are mounted, whereby the weight of each plate ahead of its respective pivot is sufficiently greater than the weight of the plate behind said pivot to assure a normal nose-down position of said plate.

6. A conveyor chain as defined in claim 3 wherein said forward end portions of said plates are in close proximity to the rearward end portions of the immediately preceding plates, whereby to define a top surface for the chain which is continuous except for the joints therebetween and the normally tilted top surfaces thereof.

7. A conveyor chain as set forth in claim 6 wherein said forward end portion of each top plate is arcuately curved about a radius extending from the pivot on which said plate is mounted continuously through the sides thereof to permit each such plate to turn horizontally relative to adjacent plates, and wherein said rearward end portion of the preceding plate also is arcuately curved about a radius extending from said pivot.

8. The combination as set forth in claim 4 wherein said conveyor chain is a type having longitudinal links connected by vertical pivot pins, and wherein the pivot pins which connect said links extend through the clearance holes of said top plates.

9. A conveyor chain as defined in claim 8 including bottom plates
    also mounted on said pivot pins and defining supporting members for said chain.

10. A conveyor chain as defined in claim 9 wherein said upper plates are substantially wider than said bottom plates.

* * * * *